(12) United States Patent
Vaarala et al.

(10) Patent No.: US 8,037,302 B2
(45) Date of Patent: Oct. 11, 2011

(54) METHOD AND SYSTEM FOR ENSURING SECURE FORWARDING OF MESSAGES

(75) Inventors: Sami Vaarala, Helsinki (FI); Antti Nuopponen, Espoo (FI); Panu Pietikainen, Espoo (FI)

(73) Assignee: Mobility Patent Holding MPH Oy (FI)

( * ) Notice: Subject to any disclaimer, the term of this patent is extended or adjusted under 35 U.S.C. 154(b) by 927 days.

(21) Appl. No.: 10/490,933

(22) PCT Filed: Sep. 27, 2002

(86) PCT No.: PCT/FI02/00771
§ 371 (c)(1),
(2), (4) Date: Apr. 18, 2005

(87) PCT Pub. No.: WO03/030488
PCT Pub. Date: Apr. 10, 2003

(65) Prior Publication Data
US 2005/0177722 A1    Aug. 11, 2005

(30) Foreign Application Priority Data
Sep. 28, 2001 (FI) .................................. 20011911

(51) Int. Cl.
*H04L 9/00* (2006.01)
*H04L 29/06* (2006.01)

(52) U.S. Cl. ................... 713/160; 713/162; 713/168
(58) Field of Classification Search .............. 713/160, 713/162, 151, 171
See application file for complete search history.

(56) References Cited

U.S. PATENT DOCUMENTS

| | | | | |
|---|---|---|---|---|
| 6,091,951 | A * | 7/2000 | Sturniolo et al. | 455/432.2 |
| 6,452,915 | B1 * | 9/2002 | Jorgensen | 370/338 |
| 6,587,680 | B1 * | 7/2003 | Ala-Laurila et al. | 455/411 |
| 7,143,282 | B2 * | 11/2006 | Takagi et al. | 713/153 |

* cited by examiner

*Primary Examiner* — Gilberto Barron, Jr.
*Assistant Examiner* — Devin Almeida
(74) *Attorney, Agent, or Firm* — Fasth Law Offices; Rolf Fasth

(57) ABSTRACT

The method is for ensuring secure forwarding of a message is performed in a telecommunication network that has at least one terminal from which the message is sent and at least one other terminal to which the message is sent. One or more secure connections are established between different addresses of the first terminal and address of the other terminal. The connections define at least said addresses of the two terminals. When the first terminal moves from one address to another address, a secure connection, which endpoints are the new address of the first terminal and the address of the other terminal, is registered to be at least one of the active connections.

16 Claims, 2 Drawing Sheets

METHOD AND SYSTEM FOR ENSURING SECURE FORWARDING OF MESSAGES

PRIOR APPLICATIONS

Figure 1:
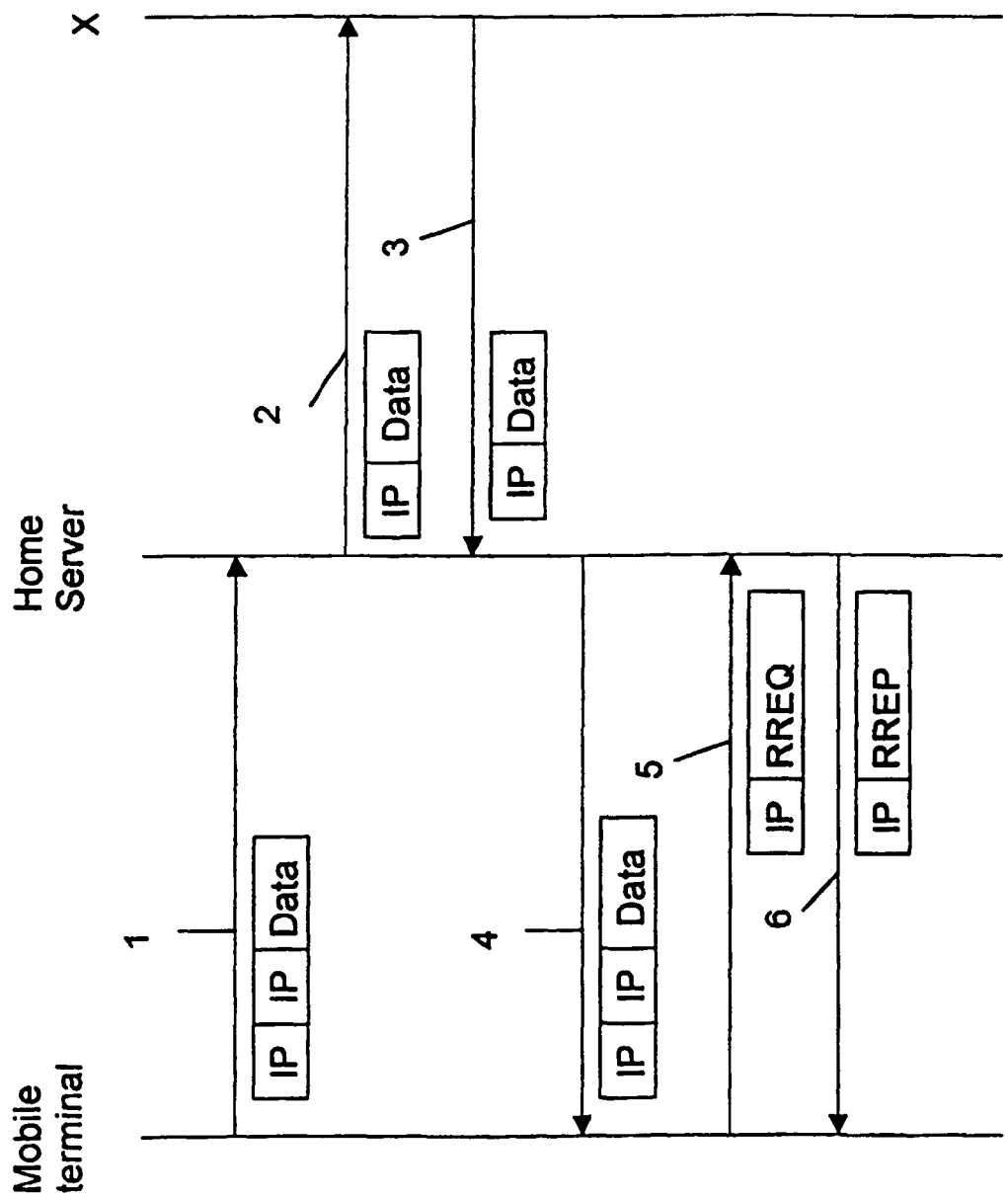

This is a US national phase patent application that claims priority from PCT/FI02/00771, filed 27 Sep. 2002, that claims priority from Finnish Patent Application No. 20011911, filed 28 Sep. 2001.

TECHNICAL FIELD

The method and system of the invention are intended to secure connections in telecommunication networks. Especially, the invention is meant to be used in wireless networks as a part of a mobile IP solution or an IPSec solution.

TECHNICAL BACKGROUND

An internetwork is a collection of individual networks connected with intermediate networking devices that function as a single large network. Different networks can be interconnected by routers and other networking devices to create an internetwork.

A local area network (LAN) is a data network that covers a relatively small geographic area. It typically connects workstations, personal computers, printers and other devices. A wide area network (WAN) is a data communication network that covers a relatively broad geographic area. Wide area networks (WANs) interconnect LANs across telephone networks and other media; thereby interconnecting geographically disposed users.

In fixed networks, there exist solutions to fill the need to protect data and resources from disclosure, to guarantee the authenticity of data, and to protect systems from network based attacks. IPSec is one such technology by means of which security is obtained.

The IP security protocols (IPSec) provides the capability to secure communications across a LAN, across private and public wide area networks (WANs) and across the internet. IPSec can be used in different ways, such as for building secure virtual private networks, to gain a secure access to a company network (as remote access IPSec use), or to secure communication with other organisations, ensuring authentication and confidentiality and providing a key exchange mechanism. Even if some applications already have built in security protocols, the use of IPSec further enhances the security.

IPSec can encrypt and/or authenticate traffic at IP level. Traffic going in to a WAN is typically encrypted and/or authenticated and traffic coming from a WAN is decrypted and/or authenticated. IPSec is defined by certain documents, which contain rules for the IPSec architecture.

Two protocols are used to provide security at the IP layer, an authentication protocol designated by the header of the protocol, Authentication Header (AH), and a combined encryption/authentication protocol designated by the format of the packet for that protocol, Encapsulating Security Payload (ESP). Both AH and ESP are vehicles for access control based on the distribution of cryptographic keys and the management of traffic flows related to these security protocols.

Security association (SA) is a key concept in the authentication and the confidentiality mechanisms for IP. A security association is a one-way relationship between a sender and a receiver that offers security services to the traffic carried on it. If a secure two-way relationship is needed, then two security associations are required.

The term IPSec connection is used in what follows in place of an IPSec bundle of one or more security associations SAs, or a pair of IPSec bundle—one bundle for each direction—of one or more security associations. This term thus covers both unidirectional and bidirectional traffic protection. There is no implication of symmetry of the directions, i.e., the algorithms and IPSec transforms used for each direction may be different.

A security association is uniquely identified by three parameters. The first one, the Security Parameters Index (SPI), is a 32-bit string assigned to this SA. The SPI is carried in AH and ESP headers to enable the receiving system to select the SA under which a received packet will be processed. IP destination address is the second parameter, which is the address of the destination end point of the SA, which may be an end user system or a network system such as a firewall or a router. The third parameter, the Security Protocol Identifier indicates whether the association is an AH or ESP security association.

Both AH and ESP support two modes used, transport and tunnel mode.

Transport mode provides protection primarily for upper layer protocols and extends to the payload of an IP packet. Typically, transport mode is used for end-to-end communication between two hosts. Transport mode may be used in conjunction with a tunnelling protocol (other than IPSec tunnelling).

Tunnel mode provides protection to the entire IP packet and is used for sending messages through more than two components. Tunnel mode is often used when one or both ends of a SA is a security gateway, such as a firewall or a router that implements IPSec. With tunnel mode, a number of hosts on networks behind firewalls may engage in secure communications without implementing IPSec. The unprotected packets generated by such hosts are tunnelled through external networks by tunnel mode SAs setup by the IPSec software in the firewall or secure router at boundary of the local network.

To achieve this, after the AH or ESP fields are added to the IP packet, the entire packet plus security fields are treated as the payload of a new outer IP packet with a new outer IP header. The entire original, or inner, packet travels through a tunnel from one point of an IP network to another no routers along the way are able to examine the inner IP packet. Because the original packet is encapsulated, the new larger packet may have totally different source and destination addresses, adding to the security. In other words, the first step in protecting the packet using tunnel mode is to add a new IP header to the packet; thus the "IP|payload" packet becomes "IP|IP|payload". The next step is to secure the packet using ESP and/or AH. In case of ESP, the resulting packet is "IP|ESP|IP|payload". The whole inner packet is covered by the ESP and AH protection. AH also protects parts of the outer header, in addition to the whole inner packet.

The IPSec tunnel mode operates e.g. in such a way that if a host on a network generates an IP packet with a destination address of another host on another network, the packet is routed from the originating host to a security gateway (SGW), firewall or other secure router at the boundary of the first network. The SGW filters all outgoing packets to determine the need for IPSec processing. If this packet from the first host to another host requires IPSec, the firewall performs IPSec processing involving encapsulation of the packet in an outer IP header. The source IP address of this outer IP packet is this firewall and the destination address may be a firewall that forms the boundary to the other local network. This packet is now routed to the other host's firewall with intermediate routers examining only the outer IP header. At the other host firewall, the outer IP header is stripped off and the inner packet is delivered to the other host.

ESP in tunnel mode encrypts and optionally authenticates the entire inner IP packet, including the inner IP header. AH in tunnel mode authenticates the entire inner IP packet and selected fields of the outer IP header.

The key management portion of IPSec involves the determination and distribution of secret keys. The default automated key management protocol for IPSec is referred to as ISAKMP/Oakley and consists of the Oakley key determination protocol and Internet Security Association and Key Management Protocol (ISAKMP). Internet Key Exchange (IKE) is a newer name for the ISAKMP/Oakley. IKE is based on the Diffie-Hellman key exchange algorithm, and supports RSA signature authentication among other modes. IKE is easily extensible for future and vendor-specific features without breaking backwards compatibility.

The IPSec protocol solves the known security problems of the Internet Protocol (IP) in a satisfactory manner. However, it is designed for a static Internet, where the hosts using IPSec are relatively static. Thus, IPSec does not work well with mobile devices.

For instance, if a mobile terminal moves from one network to another, an IPSec connection set up is required, typically using the IKE key exchange protocol. Such a set up is expensive in terms of latency, since IKE may require several seconds to complete. It is also expensive in terms of computation, because the Diffie-Hellman and authentication-related calculations of IKE are extremely time consuming.

Routing means moving information across an internetwork from one source to another. Along the way, usually at least one intermediate node is encountered. Routing involves both the determination of the optimal routing path and the transport of information packets. To aid the routing of information packets, routing algorithms initialise and maintain routing tables, which contain route information. Routers communicate with each other and maintain their routing tables through the transmission of a variety of messages. The routing update message is one such message that generally consists the whole or part of a routing table.

The fundamental problem with IP mobility is the fact that IP routing is based on fixed addresses. The address space has been divided into subnetworks, that reside in practically fixed locations with respect to network topology (the routing can be changed, but that is a slow process, possibly in the order of minutes). When a mobile host moves away from its home network (where its IP address is proper), there is a problem with the routing of the packets to the new location if the IP network in question does not support such movement.

In this text, the term mobility and mobile terminal does not only mean physical mobility, instead the term mobility is in the first hand meant moving from one network to another, which can be performed by a physically fixed terminal as well.

Standard Mobile IP for IPv4 utilises e.g. IP-IP and Generic Routing Encapsulation (GRE) tunnelling to overcome this problem (See more details in FIG. 1 with accompanying text). There are also other methods of tunnelling, and hence, IP-IP and GRE tunnelling are used only as examples in this text. Mobile IPv4 has two modes of operation. In the co-located care-of address mode the mobile terminal performs IP-IP encapsulation and decapsulation. This mode requires a borrowed address—the co-located care-of address—from the visited network. The other mode is the foreign agent mode, where the IP-IP or other tunnelling is performed by a special host in the visited network, called the Foreign Agent (FA). The mobile terminal communicates directly with the FA (an IP address is not required for this direct communication), and does not require a borrowed address in this mode.

In IP-IP tunnelling, an IP address (the so called co-located care-of address) is borrowed from a network being visited. This address is topologically correct, i.e. routable from other parts of the network. When a mobile terminal needs to send a packet to a given target computer, it first constructs an IP packet, whose source address is its home address, i.e. the address that is not topologically correct in the new network, and whose destination address is the target computer.

Since this packet may not be directly routable, it is encapsulated into another IP packet (by so called IP-IP encapsulation, or IP-IP tunnelling). The source address of this IP packet is the care-of address, and the target address is the so called home server of the mobile terminal. Upon receiving such an encapsulated packet, the home server unwraps the IP-IP tunnel, and proceeds to route the packet, which was inside the encapsulation.

Reverse packets from the target computer to the mobile terminal are handled similarly; the packet is first routed to the home server, then encapsulated in IP-IP and delivered to the current network the mobile terminal is in. The current mobility binding determines which current care-of address matches a given home address. (There may also be so-called simultaneous bindings, in which case the home address matches a set of care-of addresses; the packet is encapsulated and sent to each care-of address separately.)

When the mobile terminal moves to a new network, an authenticated signalling message exchange is done between the mobile terminal and the home server. A Registration Request is sent by the mobile terminal to the home server, requesting an update of the current mobility binding. The server responds using a Registration Reply that may either accept or deny the request. When the Foreign Agent mode of operation is used, the registration messages go through the Foreign Agent.

IP version 4 (IPv4) is the currently widely deployed Internet Protocol version. Its major disadvantage is the small number of unique, public IP addresses. IP version 6 (IPv6) has a much larger address space, which fixes the most important IPv4 problem known today. IPv6 also changes some other things in the Internet Protocol, for example, how fragmentation of packets is done, but these changes are quite small. Most protocols have separate definitions on how they are used within the IPv4 and the IPv6 context. For instance, there are separate versions of IPSec and Mobile IP for use with IPv4 and IPv6. However, such modifications to protocols are quite small, and do not usually change the essentials of the protocols significantly.

The IPSec protocol solves the known security problems of the Internet Protocol (IP) in a satisfactory manner. However, it is designed for a static Internet, where the hosts using IPSec are relatively static. Thus, IPSec does not work well with mobile devices. For instance, if a mobile terminal moves from one network to another, an IPSec connection set up is required, typically using the IKE key exchange protocol. Such a set up is expensive in terms of latency, since IKE may require several seconds to complete. It is also expensive in terms of computation, because the Diffie-Hellman and authentication-related calculations of IKE are extremely time consuming.

The above description presents the essential ideas of Mobile IP.

The mobile IP approach of prior art has some disadvantages and problems.

The standard Mobile IP protocol provides a mobile terminal with a mobile connection, and defines mechanisms for performing efficient handovers from one network to another. However, Mobile IP has several disadvantages. The security of Mobile IP is very limited. The mobility signalling messages are authenticated, but not encrypted, and user data traffic is completely unprotected. Also, there is no key exchange mechanism for establishing the cryptographic keys required for authenticating the mobility signalling. Such keys need to be typically distributed manually. In the manual prior art key management, the signalling authentication mechanism requires the mobile host and the home server to share a secret authentication key and the distribution of that key, which is carried out manually, is not very practical. Finally, the current Mobile IP protocol does not define a method for working through Network Address Translation (NAT) devices.

Said problem with Network Address Translation (NAT) devices, even if NAT devices are able to translate addresses of private networks in messages to public IP addresses so that the messages can be sent through internet, is, however, that currently no standard for making Mobile IP work through NAT devices. NAT devices are widely deployed because the use of private addresses requires less public IP addresses than would otherwise be needed.

REFERENCES

The following is a list of useful references for understanding the technology behind the invention.

IP in general, UDP and TCP:
[RFC7681]
J. Postel, *User Datagram Protocol*, RFC 768, August 1980.
ftp://ftp.isi.edu/in-notes/rfc768.txt
[RFC791]
J. Postel, *Internet Protocol*, RFC 791, September 1981.
ftp://ftp.isi.edu/in-notes/rfc791.txt
[RFC792]
J. Postel, *Internet Control Message Protocol*, RFC 792, September 1981.
ftp://ftp.isi.edu/in-notes/rfc792.txt
[RFC793]
J. Postel, *Transmission Control Protocol*, RFC 793, September 1981.
ftp://ftp.isi.edu/in-notes/rfc793.txt
[RFC826]
D. C. Plummer, *An Ethernet Address Resolution Protocol*, RFC 826, November 1982.
ftp://ftp.isi.edu/in-notes/rfc826.txt
[RFC2460]
S. Deering, R. Hinden, *Internet Protocol, Version 6 (IPv6) Specification*, RFC 2460, December 1998.
Mobile IP; IP-IP; DHCP:
[RFC2002]
C. Perkins, *IP Mobility Support*, RFC 2002, October 1996.
ftp://ftp.isi.edu/in-notes/rfc2002.txt
[RFC2003]
C. Perkins, *IP Encapsulation Within IP*, RFC 2003, October 1996.
ftp://ftp.isi.edu/in-notes/rfc2003.txt
[RFC2131]
R. Droms, *Dynamic Host Configuration Protocol*, RFC 2131, March 1997.
ftp:/ftp.isi.edu/in-notes/rfc2131.txt
[RFC3115]
G. Dommety, and K. Leung, *Mobile IP Vendor/Organization-specific Extensions*, RFC 3115, April 2001.
ftp://ftp.isi.edu/in-notes/rfc3115.txt
[MOBILEIPV6]
D. B. Johnson, C. Perkins, *Mobility Support in IPv6*, Work in progress (Internet-Draft is available), July 2000.
[DHCPV6]
J. Bound, M. Carney, C. Perking, R. Droms, *Dynamic Host Configuration Protocol for IPv6 (DHCPv6)*, Work in progress (Internet-Draft is available), June 2001.
IPSec Standards:
[RFC2401]
S. Kent, and R. Atkinson, *Security Architecture for the Internet Protocol*, RFC 2401, November 1998.
ftp://ftp.isi.edu/in-notes/rfc2401.txt
[RFC2402]
S. Kent, and R. Atkinson, *IP Authentication Header*, RFC 2402, November 1998.
ftp://ftp.isi.edu/in-notes/rfc2402.txt
[RFC2403]
C. Madson, R. Glenn, The Use of HMAC-MD5-96 within ESP and AH, RFC 2403, November 1998.
[RFC2404]
C. Madson, R. Glenn, The Use of HMAC-SHA-1-96 within ESP and AH, RFC 2404, November 1998.
[RFC2405]
C. Madson, N. Doraswamy, The ESP DES-CBC Cipher Algorithm With Explicit IV, RFC 2405, November 1998.
[RFC2406]
S. Kent, and R. Atkinson, *IP Encapsulating Security Payload (ESP)*, RFC 2406, November 1998.
ftp://ftp.isi.edu/in-notes/rfc2406.txt
[RFC2407]
D. Piper, *The internet IP Security Domain of Interpretation for ISAKMP*, RFC 2407, November 1998.
ftp://ftp.isi.edu/in-notes/rfc407.txt
[RFC2408]
D. Maughan, M. Schneider, M. Schertler, and J. Turner, *Internet Security Association and Key Management Protocol (ISAKMP)*, RFC 2408, November 1998.
ftp://ftp.isi.edu/in-notes/rfc2408.txt
[RFC2409]
D. Harkins, and D. Carrel, *The Internet Key Exchange (IKE)*, RFC 2409, November 1998.
ftp://ftp.isi.edu/in-notes/rfc2409.txt
[RFC2410]
R. Glenn, S. Kent, *The NULL Encryption Algorithm and Its Use With IPsec*, RFC 2410, November 1998.
[RFC2411]
R. Thayer, N. Doraswamy, R. Glenn, *IP Security Document Roadmap*, RFC 2411, November 1998.
[RFC2412]
H. Orman, *The OAKLEY Key Determination Protocol*, RFC 2412, November 1998.
NAT:
[RFC2694]
P. Srisuresh, G. Tsirtsis, P. Akkiraju, and A. Heffernan, *DNS extensions to Network Address Translators (DNS_ALG)*, RFC 2694, September 1999.
[RFC3022]
P. Shisuresh, K. Egevang, *Traditional IP Network Address Translator (Traditional NAT)*, RFC 3022, January 2001.
ftp://ftp.isi.edu/in-notes/rfc3022.txt

THE OBJECT OF THE INVENTION

The object of the invention is to ensure secure forwarding of messages from and to mobile terminals by avoiding the problems of prior art described above.

SUMMARY OF THE INVENTION

The method of the invention for ensuring secure forwarding of a message is performed in a telecommunication network, comprising at least one terminal from which the message is sent and at least one other terminal to which the message is sent. In the method, one or more secure connections are established between different addresses of the first terminal and address of the other terminal, the connections defining at least said addresses of the two terminals. When the first terminal moves from one address to another address, a secure connection, whose endpoints are the new address of the first terminal and the address of the other terminal, is registered to be at least one of the active connections.

If there does not already exist such a secure connection between the new address and the other terminal, a new secure connection between the new address and the other terminal address has to be formed.

The terminals might have several active connections. In the invention, the terminal might in one embodiment also have only one secure active connection at a time, which can be changed in according with the invention to be defined to be between the address the terminal moves to and the address of the other terminal.

In the invention, the first terminal is movable from one network to another. Such a terminal can physically be a mobile terminal or a fixed terminal.

The invention is moreover concerned with a system, which is able to perform the method of the invention. The characteristics of the system are defined by the system main claim, the subclaim defining the functions that can be performed by the system of the invention.

The secure connections are preferably established by forming Security Associations (SAs) using the IPSec protocols and the message to be forwarded consists of IP packets. The key exchange being a part of the forming of a secure connection is performed manually or automatically with IKE or some other automated key exchange protocol.

When a new secure connection is formed, it is registered for immediate and/or later use. The registration for later use is made using a connection table, which is maintained by both hosts participating in the forming of the secure connection. The connection table is also used e.g. when the first terminal moves, and needs to determine whether a secure tunnel already exists for the new address. The table can be e.g. a Security Association DataBase (SADB), which is the nominal place to store IPSec SAs in the IPSec model.

In the preferred embodiment, IPSec security associations are used as secure connections. The table, through which the existence of a given IPSec SA (in either the first terminal or the other terminal) is determined, is then the IPSec Security Association DataBase (SADB).

The actual connection(s) to be used is registered by means of a signalling message or signalling message exchange between the first terminal and the other terminal, for example by means of Registration Request and possibly Registration Reply messages.

The request message may update a set of security associations, for instance, a single security association, a security association bundle, an IPSec connection, a group of IPSec connections, or any combinations of these. In practice, it is useful to update either a single IPSec connection or a group of IPSec connections. The latter may be important if separate IPSec connections are used for different kinds of traffic. A single request message can then update all (or a certain set) of such connections to a new address, instead of requiring separate requests for each IPSec connection. In the following, the case of updating a single IPSec connection is discussed, without limiting the invention to this behaviour.

The new address of the first terminal can also be updated automatically by the other terminal when the first terminal sends a message from its new address.

The active SA is a stored mobility binding that maps a given terminal address to one or more IPSec tunnel mode SAs (or zero such SAs, if the terminal in question is not connected). These mobility bindings are manipulated when Registration Request and Registration Reply messages are processed when sending packets to the first terminal. It is possible to restrict traffic from the first terminal to only the IPSec SAs that are currently registered in the mobility binding, but allowing traffic from all shared SAs is also reasonable.

The mobility binding is necessary, since each of the shared IPSec security associations is valid for securing traffic. There has to be some way for the first terminal to determine which security association(s) to actually use when processing packets. The mobility binding serves this purpose in the invention.

The first terminal may use any IPSec tunnel SA it shares with the other terminal. It is possible to restrict traffic from the first terminal to only the IPSec SAs that are currently registered, but this is not an essential feature. Thus, the first terminal may use any IPSec tunnel SA it shares with the other terminal when sending packets. The other terminal may restrict traffic only to IPSec SAs that are currently active in the mobility binding, but allowing traffic from all shared SAs is also reasonable.

The invention can be used for direct end-to-end communication, in which case the secure tunnel is established between these end computers. If applied to IPSec, this could correspond to either an IPSec transport mode or tunnel mode SA The message might also be sent first to an intermediate computer, whereby the outer address of the IPSec tunnel is unwrapped by the intermediate computer and the message is forwarded as plain text to the end destination computer.

Thus, in the solution of the invention, an IPSec security association is used instead of the IP-IP tunnelling. The invention can also be used for tunnelling with IPSec transport mode and an external tunnelling mechanism, such as Layer 2 Tunnelling Protocol (L2TP).

The invention provides the following advantages.

IPSec key management and strong authentication can be leveraged for this application involving asymmetric (RSA) authentication, the use of the Diffie-Hellman key exchange algorithm, the possibility to use certificates etc.

The IPSec symmetric encryption and authentication methods can be used to protect both signalling and data traffic. This provides confidentiality and integrity and any future developments of IPSec can be taken advantage of.

The NAT traversal problem can be solved by using any available NAT traversal mechanisms for IPSec. One is currently being standardised for IPSec, but any other IPSec NAT traversal mechanism may be used.

The invention can be used in different networks, such as IPv4 and IPv6.

In the following the invention is described more in detail by means of an advantageous embodiment in an example network but is not restricted to the details thereof.

FIGURES

Figure 2:
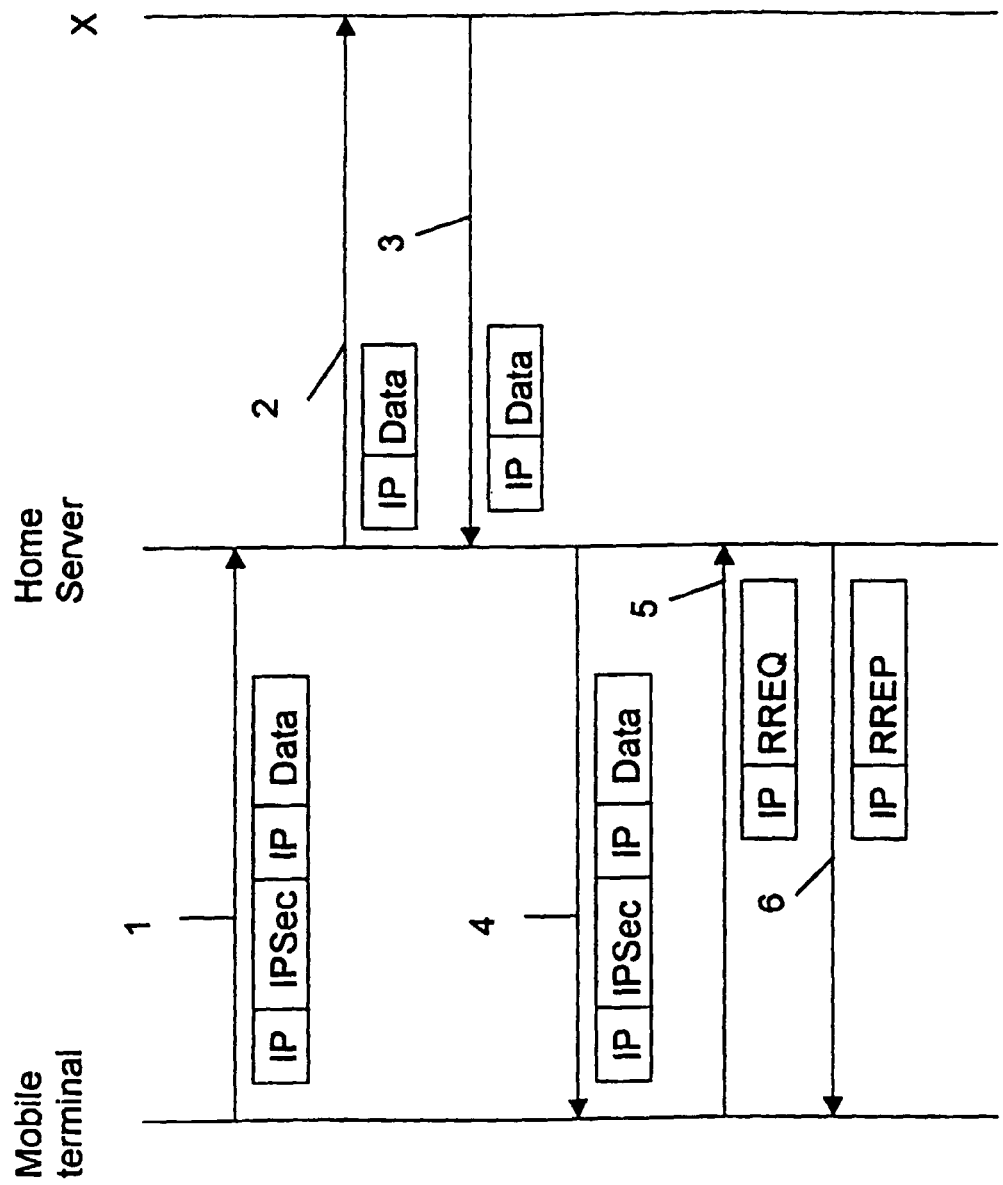

FIG. 1 describes the mobile IP tunneling of prior art by means of a signalling diagram FIG. 2 describes the method of the invention by means of a signalling diagram

DETAILED DESCRIPTION

The data communication in FIG. 1 takes place from a mobile terminal to a target host X via an intermediate computer, which works as a home server for host X.

Packets sent from the home address of the mobile terminal can be directly routed to the target address X by the intermediate computer, since the home address is registered in routing tables by means of which the routing takes place.

FIG. 1 describes a method of prior art, wherein IP-IP tunnelling is used for routing data packets when the mobile host moves from one address to another, i.e. from the home address to a new address.

Mobile IP also supports the so-called triangular routing mode, where the packets sent by the mobile terminal are routed directly to the recipient of the packet, bypassing the home server, while packets sent to the mobile terminal are first routed to the home server and then IP-IP tunnelled to the mobile terminal. This mode is more efficient, but is incompatible with so-called ingress filtering routers, which do not route IP packets whose source addresses are topologically incorrect, as is the case with a mobile terminal that is away from the home network. The details of this mode are different, but the general idea is the same. The more general case where IP-IP tunnelling is used for traffic between the mobile terminal and the home server in both directions is discussed in the following text.

In FIG. 1, when a mobile terminal being in a visited network intends to send a packet to a target host X using its current care-of address, which is an address borrowed from the visited network, it first constructs a data packet, whose source address is its home address—which is not a topologically correct address in the current network the mobile terminal is in—and whose destination address is X. Because the source address of the packet is topologically incorrect, i.e., does not belong to the network the mobile terminal is in, some routers, especially the ones that implement the so-called ingress filtering algorithm, will not route the packet properly. To overcome this, the packet is encapsulated into another IP packet; this process is called IP-IP tunnelling or IP-IP encapsulation. The new, outer IP header source address is the care-of address from the visited network—which is a topologically correct address—and the outer IP header destination address is the home server of the mobile terminal. Thus, the inner IP header source address is the home address of the mobile terminal, while the inner IP header destination address is that of the host X. This is indicated in FIG. 1 with IP|IP|data, which describes a message containing data and the original IP header, which is encapsulated further in an outer IP header for routing purposes. This IP packet is then sent to the home server in step 1 of FIG. 1.

Upon receiving the encapsulated IP packet, the home server unwraps the IP-IP tunnel, and proceeds in step 2 of FIG. 1 with routing a packet indicated with IP/Data, which packet was inside the encapsulation (inside the outer IP header). The routing is performed in accordance with the inner destination address, the packet now, after the unwrapping, having the home address of the mobile terminal as its source address and host X as its destination address.

Reverse packets from X to the mobile terminal are handled similarly; the packet is first routed to the home server in step 3, then encapsulated in IP-IP and delivered to the current network (in step 4) the mobile terminal is in. The mobility binding determines which care-of address(es) the packet is forwarded to.

In the method of the invention, an IPSec tunnel mode or transport mode security association is used instead of the IP-IP tunnelling. FIG. 2 describes an example of the method of the invention for sending messages when a mobile terminal moves to a new address.

A secure connection, preferably an IPSec security association (SA) or more specifically one IPsec SA bundle for each direction of communication is established between the care-of-address and the home server address, e.g. the care-of-address of the mobile terminal and the home server address. The SA can also include additional parameters and attributes, possibly relating to standard or non-standard IPSec extensions, such as NAT traversal, which are conventionally used in SAs. A message to be sent through this tunnel is marked IP/IPSec/IP/Data in FIG. 2, illustrating that the message contains a data part with a destination IP address and can be sent through an IPSec tunnel, while encapsulated with an outer IP header.

Reverse packets from X to the mobile terminal are handled similarly; the packet is first routed to the home server in step 3, then IPSec processed using the IPSec tunnel mode SA, during which an outer IP header is added to the packet and delivered to the current network(s) (in step 4) the mobile terminal is in.

When IPSec transport mode is used, the mobile terminal may either communicate directly with the home server, or alternatively some external tunnelling protocol (apart from IPSec tunnelling) can be used to allow routing of packets further. For example, the Layer 2 Tunnelling Protocol (L2TP) can be used with IPSec transport mode to provide functionality similar to IPSec tunnelling.

When the mobile terminal moves to a new network, it first obtains a care-of address from the visited network. The mobile terminal then checks whether an SA (or more precisely, a pair of SA bundles) SA already exists between the new care-of address and the home server address.

This check is normally done by inspecting the contents of a Security Association DataBase (SADB), as specified by the IPSec protocol. The actual implementation may somewhat deviate from the nominal processing. The nominal model and the actual operations often are in reality somewhat different (for instance, hardware IPSec implementations have a radically different "SADB" implementation than simple lookup.) If an IPSec security association (SA) between the mobile terminal and the home server defining the care-of address of the mobile terminal at one end (the new address of the mobile terminal) and the address of the home server at the other end already exists, this SA is registered to be the actual SA to be used.

This happens by means of a signalling message or signalling message exchange done between the mobile terminal and the home server, described by steps 5 and 6 in FIG. 2. The messages are preferably authenticated and/or encrypted by using IPSec, and preferably by using the same IPSec SA that is used for the ordinary traffic protection. In some embodiments no reply is used. Step 5 is a registration request from the mobile host to the home server to register the new address and step 6 is a registration reply back to the mobile terminal.

When a SA does not exist between the new care-of address and the home server, an SA setup occurs between steps 4 and 5 of FIG. 2. This SA setup may be manual, or may involve some automatic key exchange protocol, such as the Internet Key Exchange (IKE).

Upon receiving the IPSec protected packet sent using the new SA, the home server processes the IPSec headers and uncovers the original packet from the IPSec tunnel, and then routes the IP packet to host X. If IPSec transport mode is used, the home server processes the IPSec headers and processes the resulting plaintext packet directly without routing it onwards. However, if an external tunnelling protocol, such as L2TP, is used, the tunnelling protocol may forward the packet after IPSec processing.

In FIG. 2, the RREQ and RREP messages are shown without IPSec protection. In an IPSec embodiment, the IPSec protected messages would be expressed e.g. as IP|IPSec|IP|RREQ resp. IP|IPSec|IP|RREP instead of IP|RREQ resp. IP|RREP. Thus, RREQ/RREP can be protected and one method of protection would be IPSec. If they are protected using IPSec, one can leverage the existing IPSec SA for that purpose. The IPSec protection of signalling message(s) may use either tunnel or transport mode.

The abbreviation RREQ in FIG. 2 stands for Registration Request while the abbreviation RREP stands for Registration Reply. These are preferably the Mobile IP Registration Request and Registration Reply messages, used in conjunction with IPSec in the invention, but other registration formats may be used. It is also within the scope of the invention to only use a Registration Request message (not necessarily using the exact Mobile IP format), but not using a Registration Reply message.

The invention also covers both the case wherein properly authenticated traffic is used as an implicit registration request, and a mobility binding update is performed automatically. As a specific example, an IPSec tunnel mode SA bundle, including an AH used for sending traffic, in which case the addresses of the outermost IP header are covered by AH authentication, is used between the mobile terminal and the home server. When the mobile terminal moves to a new network, it sends a data packet which may be an empty data packet if there is no data to send that is processed using the IPsec SA bundle and sent to the home server. Once the home server properly authenticates the message, including the outermost IP header, and determines that it is coming from an address that differs from the current mobility binding, it may update the mobility binding automatically. Updating the binding results in that all subsequent packets being destinated to the mobile terminal, will be sent using the updated mobility binding, i.e. the new address that the client is using. Thus, no explicit mobility binding update signalling is required in this case.

The description of the invention above has been simplified for clarity of description. The invention can be extended in several ways without changing the underlying idea. Some extensions are described in what follows.

The Mobile IP concept of simultaneous bindings, and associated traffic n-casting from the home server to the mobile terminal can be used. In this case, packets sent towards the mobile terminal would be processed using several IPSec SAs, one for each simultaneous registration, and sent to the different visited networks used by the mobile terminal. The registration message(s) in this case contain fields that indicate how the mobility binding is to be modified, e.g. whether to replace existing bindings, or to add a new binding in addition to the existing ones. The implicit registration based on data packets can also be used, possibly together with registration message(s) to maintain the bindings.

When an IPSec SA does not exist between the new care-of address and the home server address, and an IPSec SA is set up e.g. using an automated key exchange protocol, the completion of the SA setup can be used as an implicit registration, removing the additional registration in steps 5 and possibly 6 in FIG. 2.

When in the above "a Security Association SA" or "a bundle of Security Associations SAs" is referred to, this means in practice, an IPSec SA bundle in both cases—one or more IPSec security associations applied in sequence—can be used for each direction of traffic.

The invention is not specific to IPv4 or IPv6, and can be used with Mobile IP for IPv4 and Mobile IP for IPv6. The invention is also straightforward to extend to future IPSec versions

The invention claimed is:

1. A method for ensuring secure forwarding of a message in a telecommunication network, comprising:
   providing a first terminal from which the message is sent and a second terminal to which the message is sent,
   a) establishing a first secure connection as being an active connection and extending between a first network address of the first terminal and an original network address of the second terminal, establishing a second secure connection extending between a second network address of the first terminal and the original network address of the second terminal,
   b) the first terminal changing from the first network address to the second network address,
   the first terminal checking whether the second secure connection already exists, and
   c) when the second secure connection already exists, the second terminal registering the already established second secure connection as being the active connection without having to reestablish the second secure connection.

2. The method of claim 1, wherein the method further comprises establishing the second secure connection when the second secure connection does not already exist.

3. The method of claim 1, wherein the method further comprises establishing the first secure connection by using IPSec protocols.

4. The method of claim 1, wherein the method further comprises providing the message with IP packets.

5. The method of claim 1, wherein the method further comprises checking whether a secure connection between the new network address and the second terminal already exists.

6. The method of claim 5, wherein the method further comprises checking by using a connection table.

7. The method of claim 1, wherein the method further comprises using a signaling message or signaling message exchange between the first terminal and the second terminal.

8. The method of claim 1, wherein the method further comprises automatically updating the new network address of the first terminal by the second terminal when the first terminal sends a message from the new network address.

9. The method of claim 1, wherein the method further comprises using a key exchange when establishing the first secure connection.

10. The method of claim 2, wherein the method further comprises using a key exchange performed with Internet Key Exchange (IKE).

11. The method of claim 1, wherein the second secure connection is registered for immediate and/or later use.

12. The method of claim 11, wherein the registration for later use is made by the second terminal in a connection table.

13. The method of claim 3, wherein the method further comprises sending the message to secure traffic between a mobile computer and a destination computer.

14. The method of claim 13, wherein the method further comprises using a tunneling protocol together with IPSec to provide a tunneling capability.

15. The method of claim 14, wherein the method further comprises using a Layer 2 Tunneling Protocol (L2TP) tunneling protocol together with IPSec to provide a tunneling capability.

16. The method of claim 3, wherein the method further comprises using an IPSec tunnel mode to secure traffic between a mobile computer and a destination computer.

* * * * *